(12) United States Patent
Raza et al.

(10) Patent No.: US 8,099,534 B1
(45) Date of Patent: Jan. 17, 2012

(54) IMPLEMENTATION OF LOGICAL ENDPOINTS IN USB DEVICE

(75) Inventors: Syed Babar Raza, San Jose, CA (US); Sumeet Gupta, San Jose, CA (US); Pradeep Bajpai, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 318 days.

(21) Appl. No.: 11/956,273

(22) Filed: Dec. 13, 2007

Related U.S. Application Data

(60) Provisional application No. 60/870,076, filed on Dec. 14, 2006.

(51) Int. Cl.
*G06F 3/00* (2006.01)

(52) U.S. Cl. ............................................ 710/62; 710/52

(58) Field of Classification Search .................. 710/313, 710/314, 52; 711/71, 103; 370/395.1, 503
See application file for complete search history.

(56) References Cited

U.S. PATENT DOCUMENTS

| | | | |
|---|---|---|---|
| 6,715,010 B2 * | 3/2004 | Kumata | 710/71 |
| 2006/0184708 A1 * | 8/2006 | Sleeman et al. | 710/313 |
| 2007/0168583 A1 * | 7/2007 | Kim | 710/56 |

* cited by examiner

*Primary Examiner* — Cheng-Yuan Tseng

(57) ABSTRACT

A method includes receiving an endpoint address and corresponding endpoint data, the endpoint address identifying a logical endpoint associated with the endpoint data, storing the endpoint data to at least one of a plurality of memory buffers corresponding to the identified logical endpoint, and transmitting the endpoint data to a destination according to the endpoint address. A peripheral device includes a logical-to-physical memory map to store an endpoint address and corresponding endpoint data received from a first device, the endpoint address to identify at least one data stream capable of transferring the endpoint data to a second device, and a service unit to retrieve the endpoint address and corresponding endpoint data from the logical-to-physical memory map, and to transfer the endpoint data to the second device in the data stream identified by the endpoint address.

6 Claims, 5 Drawing Sheets

IMPLEMENTATION OF LOGICAL ENDPOINTS IN USB DEVICE

RELATED APPLICATIONS

This application claims priority from U.S. Provisional Application No. 60/870,076, filed Dec. 14, 2006, which is incorporated herein by reference.

FIELD OF THE INVENTION

This invention relates generally to memory systems, and more specifically to mapping physical memory for logical endpoints.

BACKGROUND OF THE INVENTION

Communication over a Universal Serial Bus (USB) typically occurs between a host and a peripheral device. Many peripheral devices support multiple endpoints, where each endpoint can exchange data with the host over the USB. The peripheral devices include multiple buffers to store endpoint data received over the USB from the host and store endpoint data to be transmitted over the USB to the host. Each endpoint is dedicated one of the buffers and the peripheral devices typically service the buffers in a FIFO manner.

Although this memory system implementation allows endpoint data to be exchanged with the host, any increase in the number of endpoints supported by the peripheral device requires a corresponding increase in the number of endpoint-dedicated buffers. In other words, the memory system is not easily scalable without adding memory buffers, which can increase the size and the cost of the peripheral device.

SUMMARY

A method comprises receiving an endpoint address and corresponding endpoint data, the endpoint address identifying a logical endpoint associated with the endpoint data, storing the endpoint data to at least one of a plurality of memory buffers corresponding to the identified logical endpoint, and transmitting the endpoint data to a destination according to the endpoint address.

The method further includes logically mapping the endpoint address to a First-In-First-Out (FIFO) buffer according to the memory buffer storing the endpoint data, retrieving the endpoint address from the FIFO buffer, and retrieving the endpoint data from the memory buffer according to the retrieved endpoint address for transmission to the destination.

The method further includes receiving an acknowledgment that the endpoint data reached the destination responsive to the transmitting of the endpoint data to the destination, and removing the endpoint address from the FIFO buffer and the endpoint data from the memory buffer responsive to the acknowledgment.

The method further includes receiving the endpoint address and the corresponding endpoint data from a first device, storing the endpoint data to an egress memory buffer corresponding to the identified logical endpoint, logically mapping the endpoint address to an egress address buffer, and transmitting the endpoint data to a second device according to the endpoint address in the egress address buffer.

The method further includes receiving another endpoint address and corresponding endpoint data from the second device, storing the endpoint data to an ingress memory buffer corresponding to the identified logical endpoint, logically mapping the endpoint address to an ingress address buffer, and transmitting the endpoint data to the first device according to the endpoint address stored in the ingress address buffer.

The method further includes receiving the endpoint address and corresponding endpoint data from a first device, receiving a directionality signal that identifies at least one second device to receive the corresponding endpoint data, and transmitting the endpoint data to the second device according to the endpoint address.

The method further includes receiving another endpoint address and corresponding endpoint data from the second device, receiving another directionality signal that identifies the first device as an intended recipient of the corresponding endpoint data, and transmitting the endpoint data to the first device according to the endpoint address.

A device comprises a logical-to-physical memory map to store an endpoint address and corresponding endpoint data received from a first device, the endpoint address to identify at least one data stream capable of transferring the endpoint data to a second device, and a service unit to retrieve the endpoint address and corresponding endpoint data from the logical-to-physical memory map, and to transfer the endpoint data to the second device in the data stream identified by the endpoint address.

The logical-to-physical memory map includes an ingress endpoint data memory to store the endpoint data received from the first device, and an ingress endpoint address buffer to store the endpoint address corresponding to the endpoint data stored in the ingress endpoint data memory, the endpoint address to identify that the second device is the recipient of the endpoint data.

The logical-to-physical memory map includes an egress endpoint data memory to store the endpoint data received from the second device, and an egress endpoint address buffer to store the endpoint address corresponding to the endpoint data stored in the egress endpoint data memory, the endpoint address to that the first device is the recipient of the endpoint data.

The logical-to-physical memory map includes an endpoint data memory to store the endpoint data to be exchanged between the first device and the second device, and an endpoint address buffer to store the endpoint address that corresponds to the endpoint data stored in the endpoint data memory.

The logical-to-physical memory map includes a bi-directional unit to provide the endpoint address to the endpoint address buffer and to provide the endpoint data to the endpoint data memory, where the bi-directional unit indicate a transfer direction of the endpoint data between the first device and the second device.

The first device is a USB Serial Bus host and the second device is a controller is a headset device.

The service unit receives an acknowledgment of the transfer of endpoint data from the second device over the data stream, and removes the endpoint address and corresponding endpoint data from the logical-to-physical memory map.

A system comprising structure for receiving an endpoint address and corresponding endpoint data, the endpoint address identifying a logical endpoint associated with the endpoint data, structure for storing the endpoint data to at least one of a plurality of memory buffers corresponding to the identified logical endpoint, and structure for transmitting the endpoint data to a destination according to the endpoint address.

The system includes structure for logically mapping the endpoint address to a First-In-First-Out (FIFO) buffer according to the memory buffer storing the endpoint data, structure for retrieving the endpoint address from the FIFO buffer, and structure for retrieving the endpoint data from the memory buffer according to the retrieved endpoint address for transmission to the destination.

The system includes structure for receiving an acknowledgment that the endpoint data reached the destination responsive to the transmitting of the endpoint data to the destination, and structure for removing the endpoint address from the FIFO buffer and the endpoint data from the memory buffer responsive to the acknowledgment.

The system includes structure for receiving the endpoint address and the corresponding endpoint data from a first device, structure for storing the endpoint data to an egress memory buffer corresponding to the identified logical endpoint, structure for logically mapping the endpoint address to an egress address buffer, and structure for transmitting the endpoint data to a second device according to the endpoint address in the egress address buffer.

The system includes structure for receiving another endpoint address and corresponding endpoint data from the second device, structure for storing the endpoint data to an ingress memory buffer corresponding to the identified logical endpoint, structure for logically mapping the endpoint address to an ingress address buffer, and structure for transmitting the endpoint data to the first device according to the endpoint address stored in the ingress address buffer.

The system includes structure for receiving the endpoint address and corresponding endpoint data from a first device;

DESCRIPTION OF THE DRAWINGS

The invention may be best understood by reading the disclosure with reference to the drawings.

DETAILED DESCRIPTION

A communication system includes a peripheral device that is scalable to support any number of endpoints. As described above, previous systems dedicate a memory buffer to each endpoint that it supports, requiring additional memory buffers when increasing the number of supported endpoints. By implementing a logical-to-physical memory mapping scheme with logical endpoints corresponding to the supported endpoints, however, the peripheral device can transfer data streams between a host device and the supported endpoints without altering the size of physical memory. Embodiments of the present invention will now be described in more detail.

Figure 1:
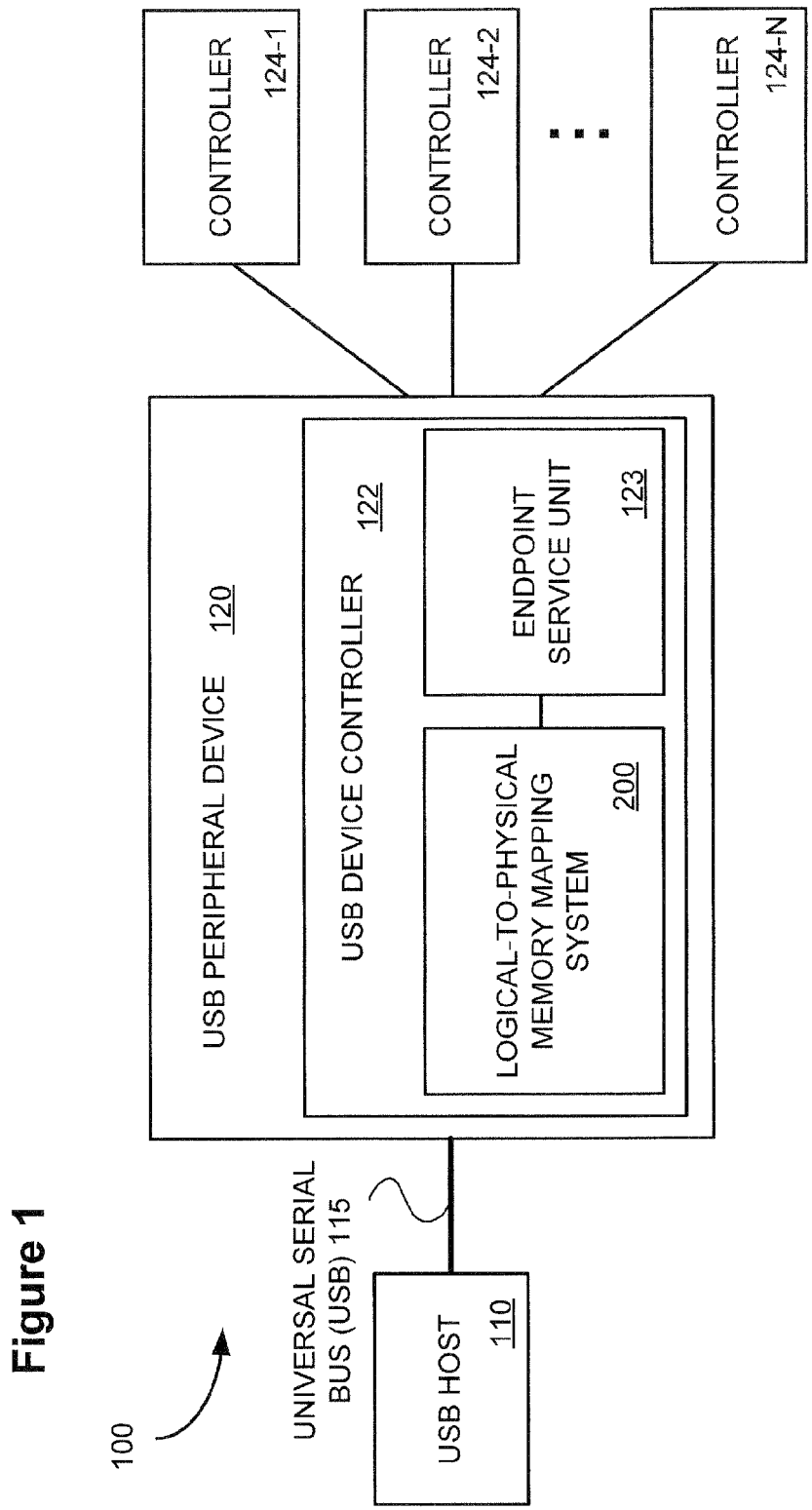
FIG. 1 illustrates, in block form, a data communication system useful with embodiments of the present invention.

FIG. 1 illustrates, in block form, a data communication system 100 useful with embodiments of the present invention. Referring to FIG. 1, the data communication system 100 includes a USB host 110 to communicate with one or more controllers 124-1 to 124-N through a USB peripheral device 120. The USB host 110 can communicate with a USB peripheral device 120 over a Universal Serial Bus (USB) 115. The USB peripheral device 120 supports a plurality of data streams or logical endpoints from either the USB host 110 over the USB 115 or the controllers 124-1 to 124-N. In case of one controller 124, the USB host 110 can use all the logical endpoints to communicate with the controller 124 using USB peripheral device 120. In some embodiments, the controllers 124-1 to 124-N can be used in a handset application or any other suitable device with processing functionality.

The USB peripheral device 120 includes a USB device controller 122 to logically multiplex multiple data streams or logical endpoints from either the USB host 110 or the controllers 124-1 124-N. This logical multiplexing allows any suitable number of data streams or logical endpoints to be provided to the USB peripheral device 120 from either the USB host 110 or controllers 124-1 to 124-N without having to modify the amount of memory in the USB peripheral device 120.

The USB device controller 122 includes a logical-to-physical memory mapping system 200 to map data exchanges between the USB host 110 and the controllers 124-1 to 124-N to the logical endpoints or data streams. The USB device controller 122 includes an endpoint service unit 123 to service the logical endpoints, for example, according to a First-In-First-Out (FIFO) procedure, and transfer between the USB host 110 and the controllers 124-1 to 124-N. Embodiments of the logical-to-physical memory mapping system 200 and USB device controller 122 will be described below in greater detail.

Figure 2A:
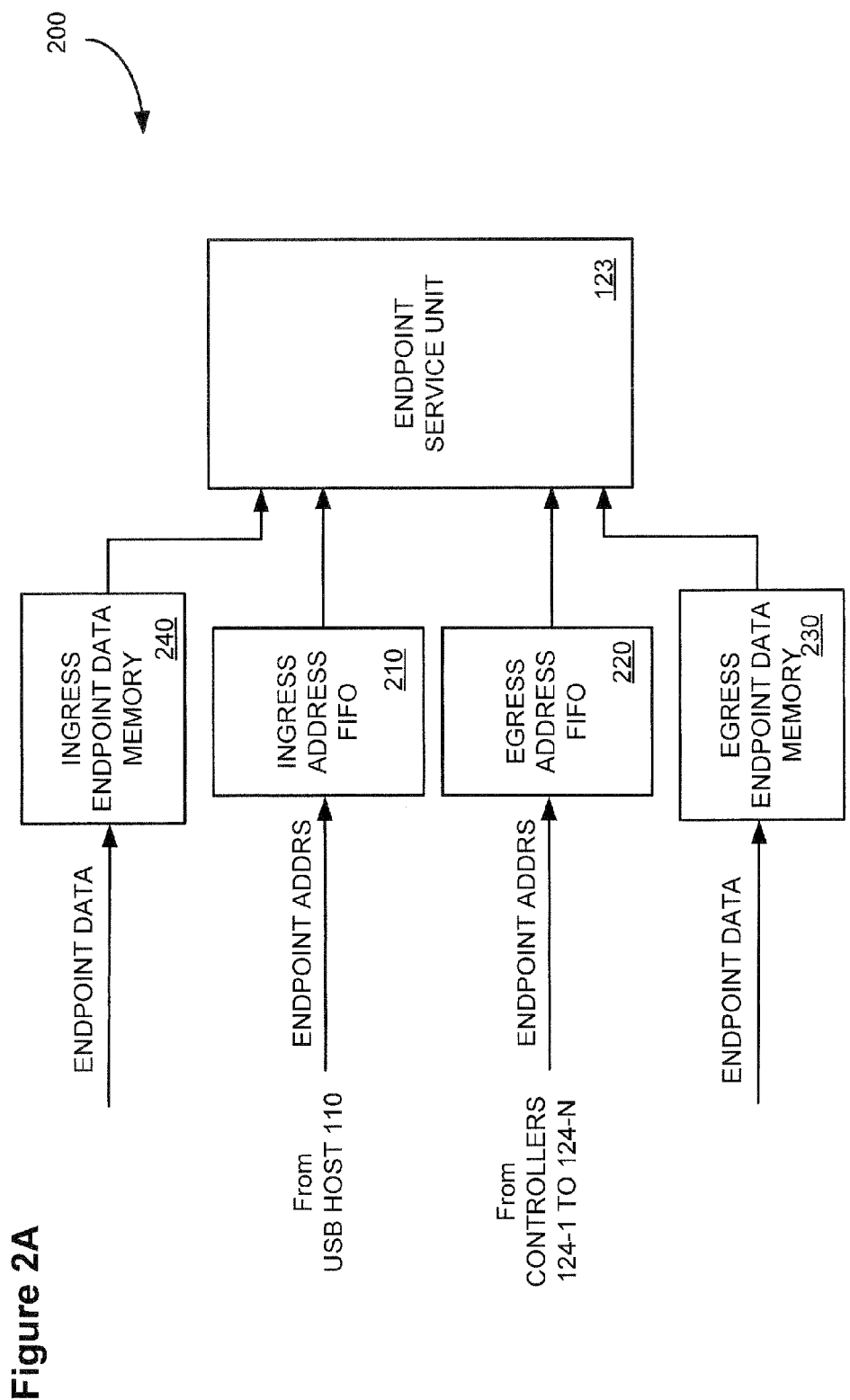
FIGS. 2A, 2B, and 3 illustrate example embodiments of the logical-to-physical memory system shown in FIG. 1.

FIG. 2A illustrates example embodiments of the logical-to-physical memory mapping system 200 shown in FIG. 1. Referring to FIG. 2A, the logical-to-physical memory mapping system 200 includes an ingress endpoint data memory 240 to store an endpoint data from the USB host 110 (FIG. 1) and an egress endpoint data memory 230 to store data from the controllers 124-1 to 124-N (FIG. 1).

The logical-to-physical memory mapping system 200 includes an ingress address FIFO 210 to store endpoint addresses from the USB host 110 (FIG. 1) and an egress address FIFO 220 to store endpoint addresses from the controllers 124-1 to 124-N (FIG. 1). The endpoint addresses can identify logical endpoints associated with the endpoint data stored in the egress data endpoint memory 230 and the ingress data endpoint memory 240. For instance, the endpoint addresses stored in the ingress address FIFO 210 correspond to the endpoint data stored in the ingress data endpoint memory 240. Similarly, the endpoint addresses stored in the egress address FIFO 220 correspond to the endpoint data stored in the egress data endpoint memory 230.

The logical-to-physical memory mapping system 200 can include the endpoint service unit 123 to select an endpoint address from either the ingress or egress address FIFOs 210 and 220 for service when prompted by the USB host 110 or the controller 124-1 to 124-N, respectively. When transferring data from at least one of the controllers 124-1 to 124-N to the USB host 110, the endpoint service unit 123 can retrieve endpoint data corresponding to an endpoint address selected from the egress data endpoint memory 230 and transfer the retrieved endpoint data to the USB host 110 in the logical endpoint or multiplexed data stream associated with the selected endpoint address. When transferring data from the USB host 110 to at least one of the controllers 124-1 to 124-N, the endpoint service unit 123 can retrieve endpoint data corresponding to an endpoint address selected from the ingress data endpoint memory 240 and transfer the retrieved endpoint data to the controllers 124-1 to 124-N in the logical endpoint or multiplexed data stream associated with the selected endpoint address. Although not shown in FIG. 2A, the endpoint service unit 123 can include a controller to assist in the operation of the endpoint service unit 123.

The endpoint service unit 123 can remove the selected endpoint address from the ingress or egress address FIFOs 210 and 220 upon completion of the endpoint data transfer. For instance, when the endpoint data transfer is to the USB host 110, the endpoint service unit 123 can remove the selected endpoint address from the egress address FIFO 220 after sending data and receiving an acknowledgement from the USB host 110. The endpoint data can also be removed from the egress data endpoint memory 230 when removing the selected endpoint address. When the endpoint data transfer is to the controller 124-1 to 124-N corresponding to the selected endpoint address, the endpoint service unit 123 can remove the selected endpoint address from the ingress address FIFO 210 after sending the data and receiving an acknowledgement from the appropriate controller 124-1 to 124-N.

Figure 2B:
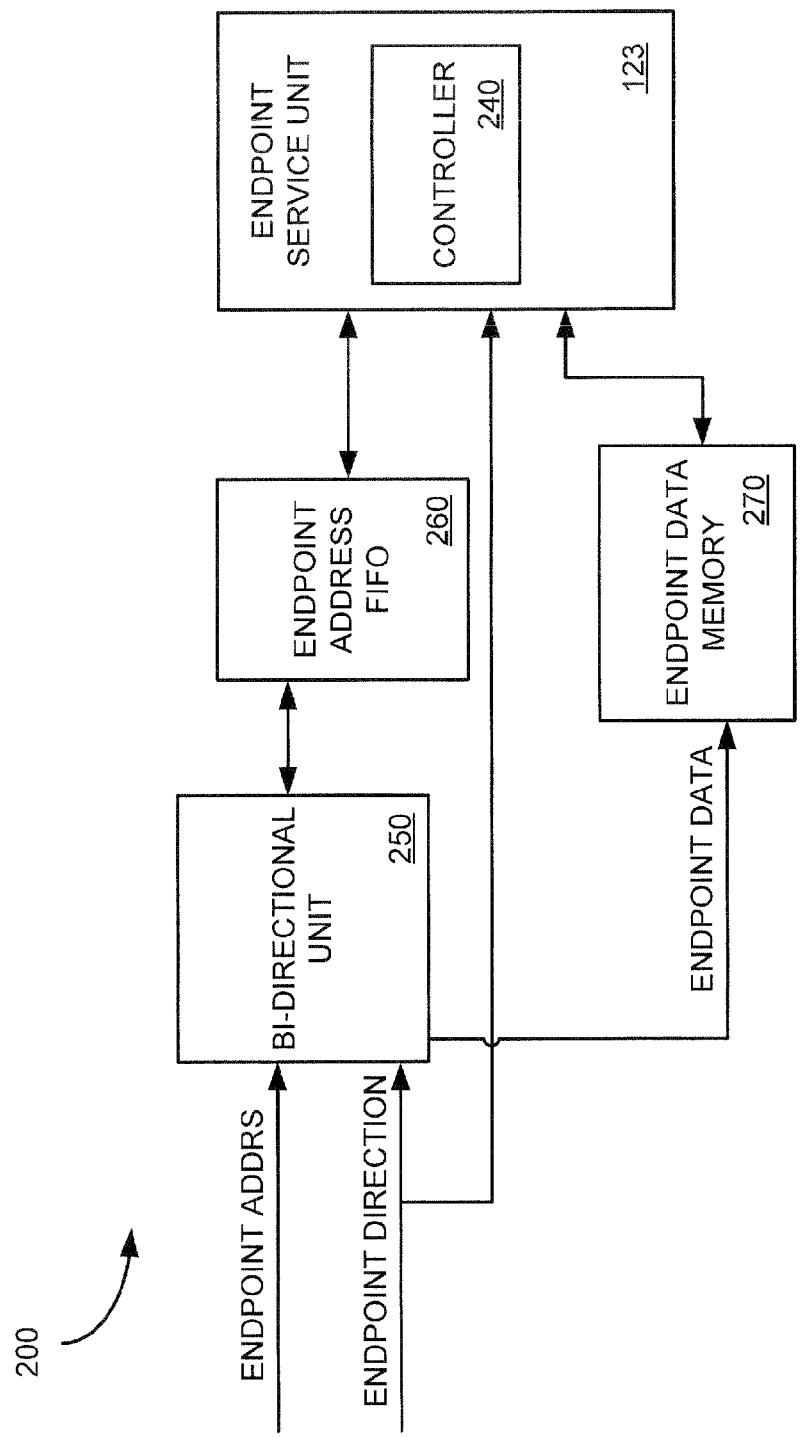

FIG. 2B illustrates example embodiments of the logical-to-physical memory mapping system 200 shown in FIG. 1. Referring to FIG. 2B, the logical-to-physical memory mapping system 200 includes an endpoint address FIFO 260 to store an endpoint address that corresponds to endpoint data stored in the endpoint data memory 270. Each endpoint address is associated with one of the logical endpoints and identifies endpoint data stored in the endpoint data memory 270.

The endpoint address FIFO 260 can be bi-directional, for example, capable of receiving endpoint addresses from either the USB host 110 or the controllers 124-1 to 124-N. The logical-to-physical memory mapping system 200 includes a bi-directional unit 250 to dictate the directionality of the endpoint address FIFO 260 responsive to an endpoint direction signal. The endpoint direction signal can identify the direction of endpoint data transfers between the USB host 110 and the controllers 124-1 to 124-N.

The logical-to-physical memory mapping system 200 includes an endpoint service unit 123 to select an endpoint address from the endpoint FIFO 260 for service. The endpoint service unit 123 can also receive the endpoint data that corresponds to the selected endpoint address. The endpoint service unit 230 can transfer the endpoint data to at least one of the controllers 124-1 to 124-N, or transfer the endpoint data to the USB host 110 depending on the configuration of the endpoint FIFO 260, in the logical endpoint or data stream identified by the selected endpoint address.

The endpoint service unit 123 can remove the selected endpoint address from the endpoint address FIFO 260 upon completion of the endpoint data transfer. For instance, when the endpoint data transfer is to the USB host 110, the endpoint service unit 123 can remove the selected endpoint address from the endpoint address FIFO 260 after sending data to the USB host and receiving an acknowledgement from the USB host 110. When the endpoint data transfer is to the controllers 124-1 to 124-N, the endpoint service unit 123 can remove the selected endpoint address from the endpoint address FIFO 260 responsive to receiving an acknowledgement from the appropriate controller 124-1 to 124-N via the logical endpoint.

Figure 3:
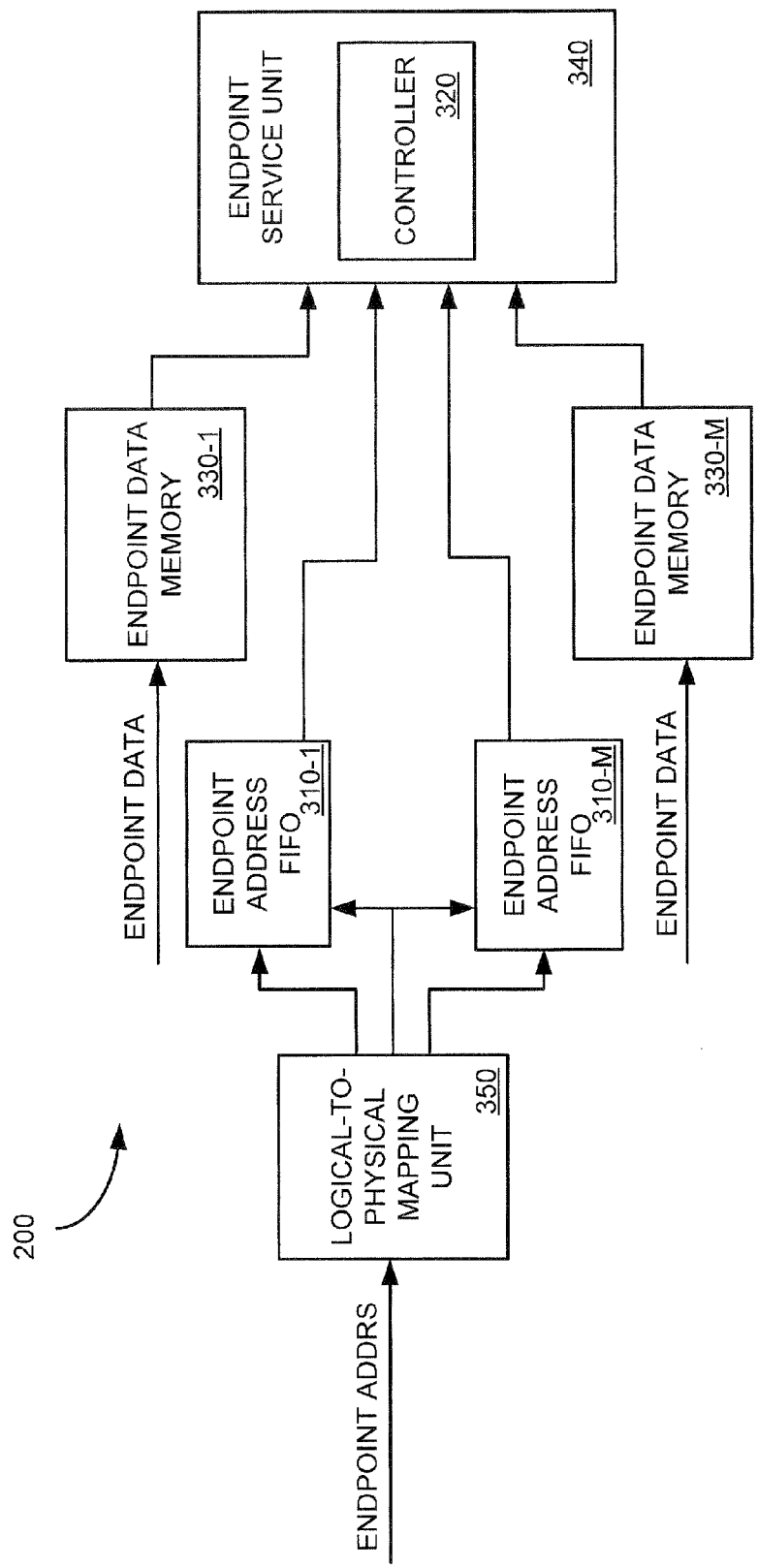

FIG. 3 illustrates example embodiments of the logical-to-physical memory mapping system 200 shown in FIG. 1. Referring to FIG. 3, the logical-to-physical memory mapping system 200 includes a distributed endpoint data memory 330-1 to 330-M to store endpoint data, and multiple endpoint address FIFOs 310-1 to 310-M to store endpoint addresses associated with the endpoint data. In some embodiments, each endpoint data memory 330 has an associated endpoint address FIFO 310.

The endpoint address FIFOs 310-1 to 310-M can be bi-directional or store addresses corresponding to endpoint data transfers to the controllers 124-1 to 124-N and to the USB host 110. The logical-to-physical memory mapping system 200 can identify the direction of the data transfers responsive to an endpoint direction signal, for example, that can be provided to a logical-to-physical mapping unit 350. In some embodiments, the endpoint address FIFOs 310-1 to 310-M can include an ingress endpoint address FIFO for data transfers to the controllers 124-1 to 124-N (FIG. 1) and an egress endpoint address FIFO for data transfers to the USB host 110 (FIG. 1).

The logical-to-physical memory mapping system 200 includes a logical-to-physical mapping unit 350 to receive the endpoint addresses from either the USB host 110 (FIG. 1) over the USB 115 or from the controllers 124-1 to 124-N. The logical-to-physical mapping unit 350 provides the endpoint addresses to the endpoint address FIFO 310-1 to 310-M that corresponds to the endpoint data memory 330-1 to 330-M storing endpoint data associated with the endpoint addresses. The logical-to-physical mapping unit 350 also provides the signal for selecting the corresponding data and endpoint address FIFOs 310-1 to 310-M. For instance, when the logical-to-physical memory mapping system 200 receives an endpoint address and endpoint data from either the USB host 110 or the controllers 124-1 to 124-N, the endpoint data is stored to an endpoint data memory 330-1 to 330-M and the logical-to-physical mapping unit 350 provides the endpoint address to the endpoint address FIFO 310-1 to 310-M that corresponds to endpoint data memory 330-1 to 330-M storing the endpoint data.

The logical-to-physical memory mapping system 200 includes an endpoint service unit 340 to select an endpoint address from one of the endpoint address FIFOs 310-1 to 310-M for service. The USB host 110 or the controllers 124-1 to 124-N can direct the endpoint service unit 340 select a next endpoint address from the one of the endpoint address FIFOs 310-1 to 310-M. The endpoint service unit 340 can also receive the endpoint data that corresponds to the selected endpoint address. The endpoint service unit 340 can transfer the endpoint data to one of the controllers 124-1 to 124-N (FIG. 1) or transfer the endpoint data to the USB host 110 (FIG. 1).

The endpoint service unit 340 can remove the selected endpoint address from the endpoint address FIFO 310-1 to 310-M upon completion of the endpoint data transfer. For instance, when the endpoint data transfer is to the USB host 110, the endpoint service unit 340 can remove the selected endpoint address from the endpoint address FIFOs 310-1 to 310-M responsive to receiving an acknowledgement from the USB host 110. When the endpoint data transfer is to the controllers 124-1 to 124-N corresponding to the selected endpoint address, the endpoint service unit 340 can remove the selected endpoint address from the endpoint address FIFOs 310-1 to 310-M responsive to receiving an acknowledgement from the appropriate controller 124-1 to 124-N.

Figure 4:
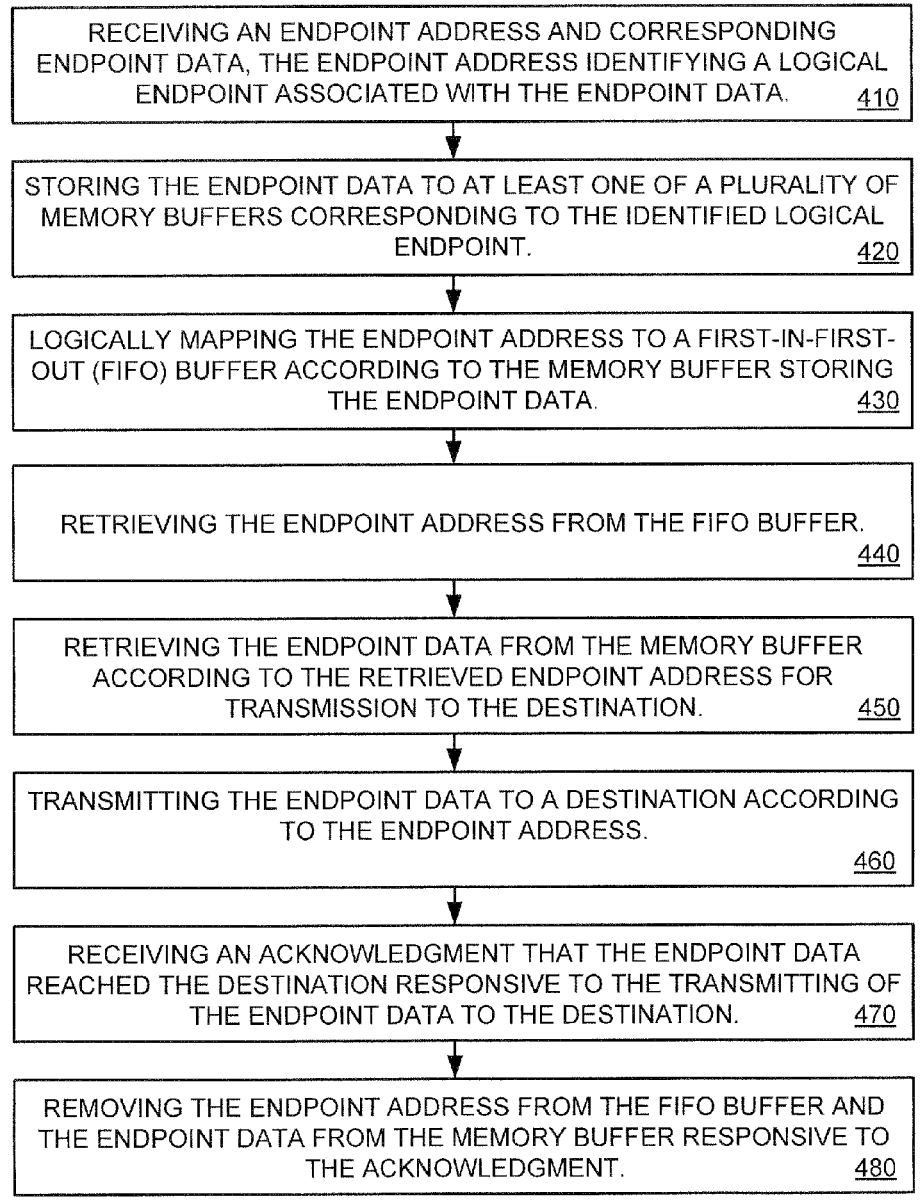
FIG. 4 is an example flowchart embodiment implementing logical endpoint data communication.

FIG. 4 is an example flowchart embodiment implementing logical endpoint data communication. Referring to FIG. 4, at a block 410, the USB peripheral device 120 receives an endpoint address and corresponding endpoint data, the endpoint address identifying a logical endpoint associated with the endpoint data. The USB peripheral device 120 can receive the endpoint address and endpoint data from either the USB host 110 or one or more of the controllers 124-1 to 124-N.

At a block 420, the USB peripheral device 120 stores the endpoint data to at least one of a plurality of memory buffers corresponding to the identified logical endpoint. The memory buffers can be the ingress endpoint data memory 240, egress endpoint data memory 230, endpoint data memory 270, or endpoint data memory 330-1 to 330-M as shown and described above in FIGS. 2A-B, and 3.

At a block 430, the USB peripheral device 120 logically maps the endpoint address to a First-In-First-Out (FIFO) buffer according to the memory buffer storing the endpoint data. The FIFO buffer can be the ingress address FIFO 210, the egress address FIFO 220, the endpoint address FIFO 260 or 310-1 to 310-M.

At a block 440, the USB peripheral device 120 retrieves the endpoint address from the FIFO buffer. In some embodiments, the USB peripheral device 120 includes an endpoint service unit 123 to retrieve the endpoint address from the FIFO buffer.

At a block 450, the USB peripheral device 120 retrieves the endpoint data from the memory buffer according to the retrieved endpoint address for transmission to the destination. In some embodiments, the USB peripheral device 120 includes an endpoint service unit 123 to retrieve the endpoint data from the memory buffer.

At a block 460, the USB peripheral device 120 transmits the endpoint data to a destination according to the endpoint address. The endpoint data can be transmitted to either the USB host 110 or at least one of the controllers 124-1 to 124-N depending the directionality of the USB peripheral device 120.

At a block 470, the USB peripheral device 120 receives an acknowledgment that the endpoint data reached the destination responsive to the transmitting of the endpoint data to the destination. The acknowledgement can be received from either the USB host 110 or at least one of the controllers 124-1 to 124-N.

At a block 480, the USB peripheral device 120 removes the endpoint address from the FIFO buffer and the endpoint data from the memory buffer responsive to the acknowledgment.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. Although the embodiments presented above show a Universal Serial Bus application, a person skilled in the art understands the embodiments shown and described above may incorporate other transmission media and/or data transfer protocols.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A system comprising:
a mapping system to receive, from a universal serial bus host, a first endpoint address with corresponding first endpoint data and a second endpoint address with corresponding second endpoint data, the mapping system to:
store the first endpoint data and the second endpoint data to an endpoint data buffer;
logically map the received first endpoint address and second endpoint address to an endpoint address First In First Out (FIFO) buffer; and
store the first endpoint address and the second endpoint address to the endpoint address FIFO buffer that is separate from the endpoint data buffer; and
an endpoint service unit to:
retrieve the first endpoint address from the endpoint address FIFO buffer; and
retrieve the first endpoint data from the endpoint data buffer using the retrieved first endpoint address; and
a bi-directional unit to generate a directionality signal identifying one of a plurality of destination controllers to receive the first endpoint data, wherein the endpoint service unit is to transmit the first endpoint data to the one of the plurality of destination controllers identified through the first endpoint address retrieved from the endpoint address FIFO buffer.

2. The system of claim 1, wherein the bi directional unit to provide endpoint addresses to the endpoint address FIFO buffer and to provide endpoint data to the endpoint data buffer, wherein the bi-directional unit further to indicate a transfer direction of received endpoint data.

3. The system of claim 1, wherein at least one of the destination controllers is included in a handset device.

4. The system of claim 1, wherein the service unit is further configured to receive an acknowledgment of a receipt of the first endpoint data from the one of the plurality of destination controllers, and responsive to receiving the acknowledgment, to remove the first endpoint data from the endpoint data buffer and the first endpoint address from the endpoint address FIFO.

5. The system of claim 1, wherein the endpoint service unit is configured to remove the first endpoint address from the endpoint address FIFO buffer and the first endpoint data from the endpoint data buffer responsive to a received acknowledgment.

6. The system of claim 1, wherein the mapping system is to receive a further endpoint address with corresponding further endpoint data from one of the plurality of destination controllers, and to store the further endpoint data to an egress memory buffer and to logically map the further endpoint address to an egress address FIFO buffer and wherein the endpoint service unit is further configure to transmit the further endpoint data from the egress memory buffer to the USB host based on retrieving the further endpoint address stored in the egress address FIFO buffer.

* * * * *